March 17, 1970 D. J. HUSHEK 3,500,568
PACK OF PERSONAL IDENTIFICATION AND CALLING CARDS FOR
USE AT CONVENTIONS, TRADE SHOWS AND THE LIKE
Original Filed March 24, 1967 2 Sheets-Sheet 1
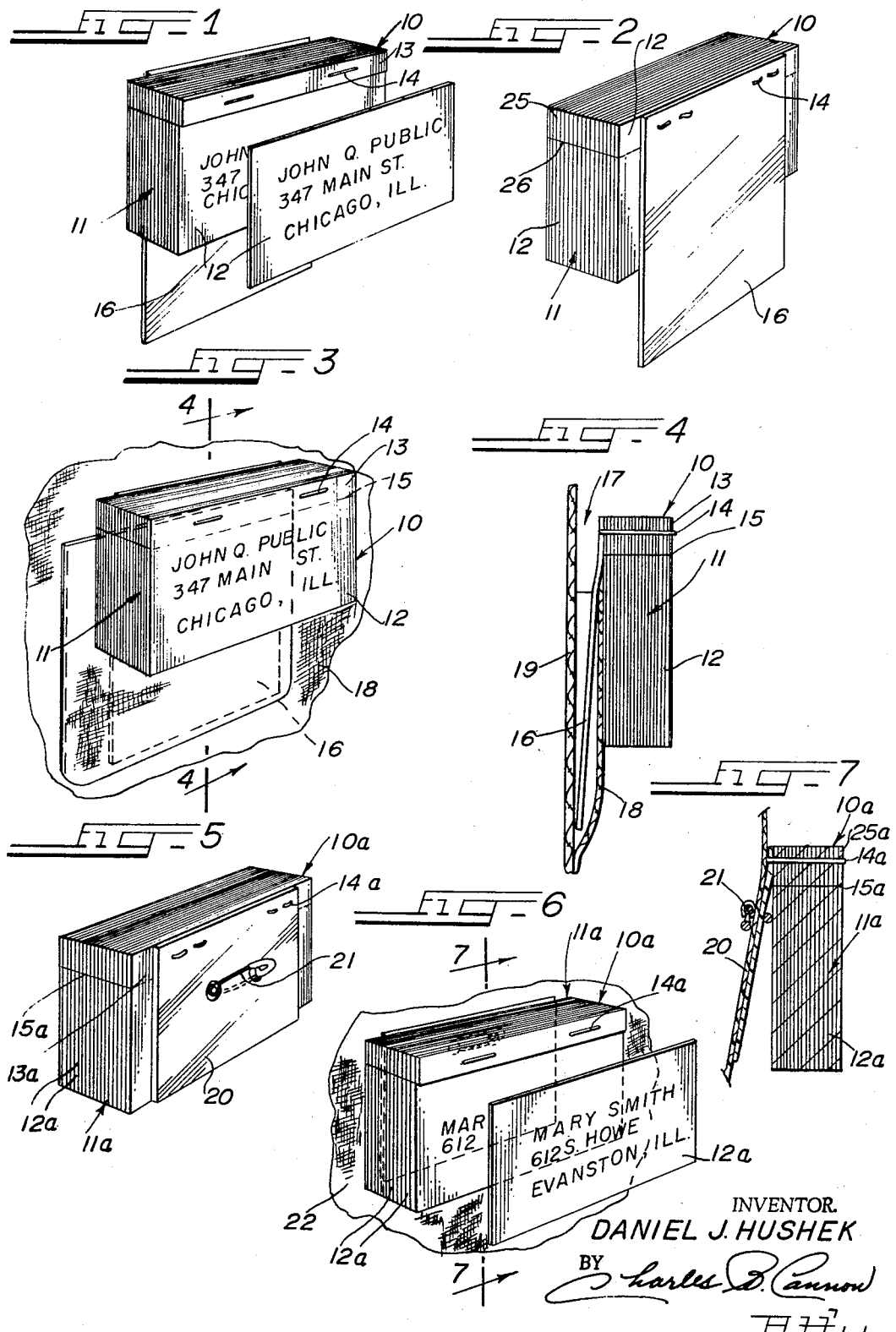
INVENTOR.
DANIEL J. HUSHEK

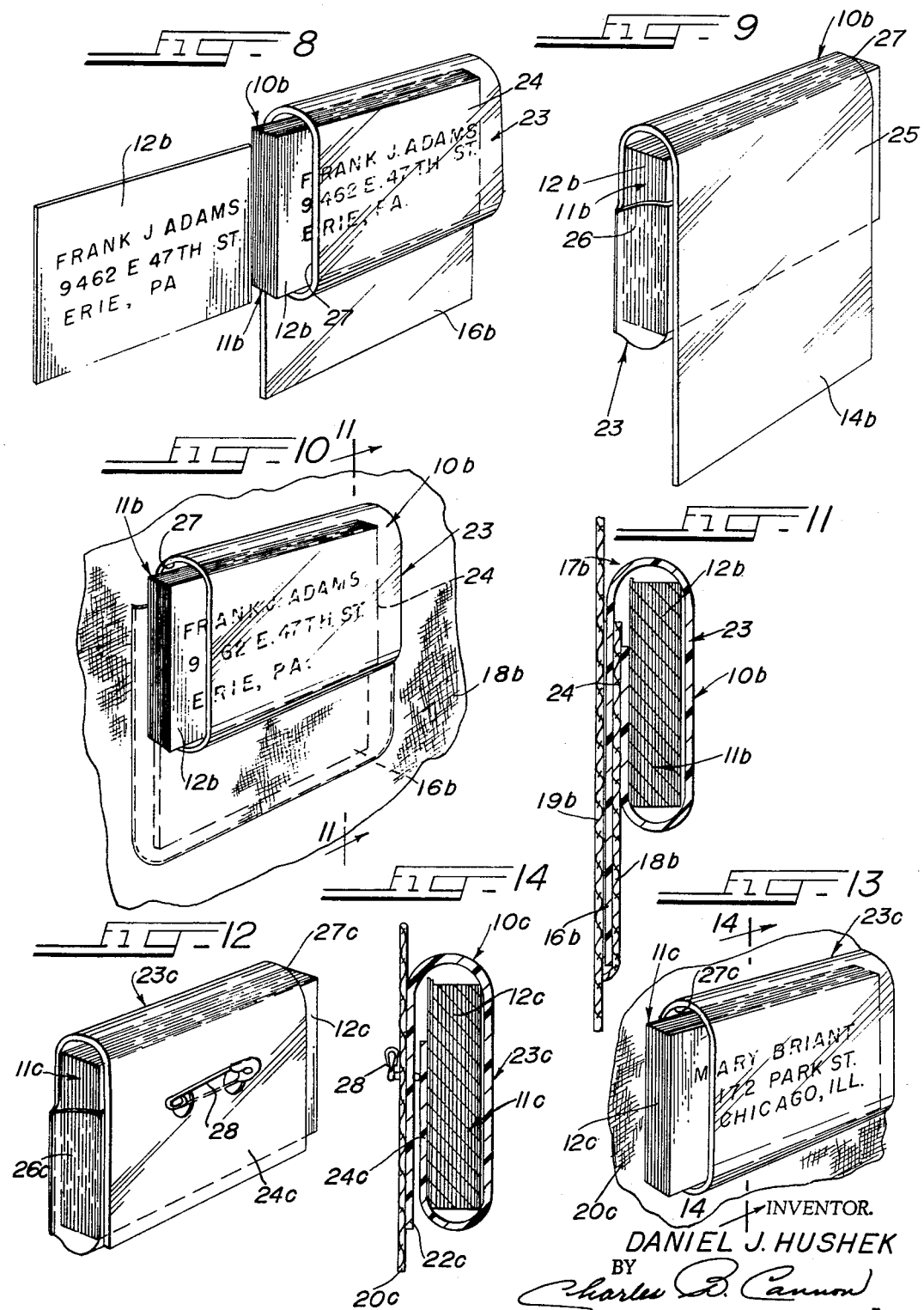

United States Patent Office 3,500,568
Patented Mar. 17, 1970

3,500,568
PACK OF PERSONAL IDENTIFICATION AND CALLING CARDS FOR USE AT CONVENTIONS, TRADE SHOWS AND THE LIKE
Daniel J. Hushek, 630 Davis St., Melrose Park, Ill. 60160
Continuation of application Ser. No. 646,437, Mar. 24, 1967, which is a continuation-in-part of application Ser. No. 309,452, Sept. 17, 1963. This application Feb. 17, 1969, Ser. No. 802,327
Int. Cl. A44c 3/00
U.S. Cl. 40—1.5   2 Claims

ABSTRACT OF THE DISCLOSURE

A pack of identical combination personal or company identification and calling cards are assembled together in such a manner that they may be worn or carried on the person of the user, as by attachment to the clothing or to a lapel pocket. The foremost card in the pack of identical cards is readily visible to the public and hence serves as a personal identification badge for use at conventions, trade shows, etc., to identify the individual or a company with which he is associated. When the wearer wishes to leave his name at a booth or exhibit he merely tears off the top card in the pack of identical cards and the thus removed card then serves as a calling card, while at the same time, the foremost card remaining in the pack continues to serve as a personal identification badge. This process is repeated until the entire back of cards has been exhausted.

---

This application is a continuation of application S.N. 646,437 filed Mar. 24, 1967 which in turn was a continuation in part of application S.N. 309,452 filed Sept. 17, 1963 both of which applications are now abandoned.

This invention relates to a combination personal identification badge and card unit and, more particularly, to a personal identification badge and card unit which is adapted to be worn upon the clothing of the user at conventions, exhibitions, trade shows, and the like.

It is common practice for persons in attendance at conventions, exhibitions, trade shows, and the like, to register with an attendant at a registration desk and to be provided at that time with a personal identification badge which may be worn upon the clothing of the person.

It is likewise common practice in connection with persons attending conventions, exhibitions, trade shows, and the like, to call or visit at various exhibits and booths for the purpose of examining products or devices displayed at such exhibits, picking up trade literature, and for like purposes, and such exhibitors frequently desire to make a record of the names and addresses of the persons visiting their exhibits, booths, and the like, for the purpose of sending them additional trade literature, keeping their names and addresses on a mailing list, and for other purposes. Moreover, such mailing lists are frequently made up by the attendants at exhibits or booths at such conventions, trade shows, and the like, by transcribing the names and addresses from the personal identification badges worn by the persons in attendance at such conventions, trade shows, and the like.

OBJECTS

An object of the present invention is, therefore, to provide a new and improved combination personal identification badge and card unit which may be used by persons in attendance at conventions, trade shows, and the like, and which in use overcomes the foregoing and other difficulties experienced in use of the prior personal identification badges, and the like.

Another object of the invention is to provide a new and improved combination personal identification badge and card unit which may be worn upon the clothing of the user and when so worn not only serves as a personal identification badge but also provides a pack of personal identification calling or business cards from which a single card may be readily removed by the wearer as he calls at exhibits, and booths, at conventions, trade shows, and the like, and handed to the attendant at the exhibit or booth for the purpose of enabling the attendant to use the card for the purpose of preparing a mailing list, and for other purposes.

An additional object of the invention is to provide a novel combination personal identification badge and card unit which includes a pack of personal identification data-bearing cards, means for holding the said personal identification data-bearing cards together in assembled relationship, and means for fastening the combination personal identification badge and card unit to the clothing of the user so that the foremost card in the pack of cards serves as a personal identification badge and so that the cards may be removed one at a time from the said pack of cards without removing the said combination personal identification badge and card unit from the clothing of the user and while still enabling the foremost remaining card in the said pack of cards to serve as a personal identification badge for the user.

Another object of the invention is to provide a new and improved combination personal identification badge and card unit which may be made up and supplied to persons in attendance at conventions, exhibitions, trade shows, and the like, at the time when such persons register at a registration desk at such conventions, trade shows, and the like, and so that the new combination personal identification badge and card unit may be attached to and worn upon the clothing of the user to serve as a personal identification badge while, at the same time, providing the user with a supply of personal individual calling or business cards to be furnished to attendants at exhibits, booths, and the like, as the user travels about such a convention, trade show, or the like.

Other objects of the invention will appear hereinafter.

DESCRIPTION OF FIGURES IN THE DRAWINGS

FIG. 1 is a perspective view of a combination personal identification badge and card unit embodying one form of the present invention, as seen from the front thereof, and showing one of the personal identification cards removed from the pack thereof;

FIG. 2 is a perspective view of the combination personal identification badge and card unit shown in FIG. 1, as seen from the rear thereof;

FIG. 3 is a perspective view showing the combination personal identification badge and card unit illustrated in FIGS. 1 and 2, as worn in the suitcoat pocket of the user;

FIG. 4 is a vertical sectional view on line 4—4 in FIG. 3;

FIG. 5 is a perspective view illustrating a modification of the invention, as seen from the rear of the unit;

FIG. 6 is a perspective view of the form of the invention shown in FIG. 5, as seen from the front thereof, with the front or foremost card in the pack of cards removed therefrom;

FIG. 7 is a vertical sectional view on line 7—7 in FIG. 6;

FIG. 8 is a perspective view of another form of the invention, one of the cards being shown as removed from the pack thereof and from the transparent casing in which the pack of cards is normally retained;

FIG. 9 is a perspective view of the form of the invention illustrated in FIG. 8, as seen from the rear thereof;

FIG. 10 is a perspective view showing the form of the invention illustrated in FIGS. 8 and 9 as used in conjunction with the lapel pocket of a suitcoat;

FIG. 11 is a vertical sectional view on line 11—11 in FIG. 10;

FIG. 12 is a perspective view of another from of the invention, similar to that shown in FIGS. 8 to 11, inclusive, and as seen from the rear of the unit;

FIG. 13 is a perspective view of the form of the invention shown in FIG. 12, as seen from the front thereof; and FIG. 14 is a vertical sectional view on line 14—14 in FIG. 13.

CONSTRUCTION AND USE

A typical embodiment of the new combination personal identification badge and card unit is illustrated in FIGS. 1 to 4, inclusive, of the drawings, and is therein generally indicated at 10, and includes a pack of personal identification business or calling cards 12, the lower portion or body of each of which is printed or otherwise inscribed with personal identification data, such as the name and address, etc., of the user, as shown; the upper or card-holding end portions 13 of the cards being suitably stapled or otherwise fastened together, as at 14. The printed lower portion or body of each of the cards 12 is detachably fastened to the upper or card-holding portion 13 thereof along a score line 15, or similar line of weakened union, for a reason which will be pointed out presently (FIGS. 3 and 4).

A suitable attaching means in the form of a backing and attaching sheet member 16 of resinous plastic sheet material, paperboard, or the like, is fastened, in any suitable manner, as by means of the stapling means 14, to the upper card-holding portions 13 of the cards 12, for a reason which will be pointed out presently. Thus, the backing and attaching sheet member 16 may be made of either flexible or stiff and rigid material, as desired.

In the use of the form of the invention illustrated in FIGS. 1 to 4, inclusive, the new combination personal identification business or calling cards 12 which are embodied in the new combination personal identification badge and card unit 10 are printed up with identical information thereon, such as the name and address of the user with or without the name of the company with which he is associated, and assembled together, as by stapling 14, and the backing and attaching sheet 16 attached thereto, either prior to or at the time a person arrives at a convention, exhibition, or the like, or alternatively, the new combination personal identification badge and card unit may be printed up and assembled at the time the user registers at such a convention, trade show, or the like.

Prior to or at the time the cards 12 embodied in the new combination personal identification badge and card unit 12 are printed up they may be provided with a score line 15, or like line of weakened union, whereupon the upper or card-holding end portions 13 thereof may be fastened together, as by means of the stapling 14, which may also be employed to fasten the upper end portion of the backing and attaching sheet 16 to the pack of cards 12.

In the use of the form of the invention illustrated in FIGS. 1 to 4, inclusive, the same may be used in conjunction with the lapel pocket of a suitcoat, or like garment, as generally indicated at 17 (FIG. 4), and when so used the backing and attaching sheet member 16 may be inserted downwardly into the pocket 17 between the front pocket flap 18 and the rear wall or body 19 thereof so that the pack of cards 12 is thus carried on the clothing of the wearer and the front or foremost card 12 in the pack is visible at all times so as to serve as a personal identification badge, and for the other reasons, as will be pointed out presently.

Thus, in the use of the form of the invention illustrated in FIGS. 1 to 4, inclusive, when the user thereof travels from one exhibit or booth to another at a convention, trade show, or the like, his name and address are readily visible to persons in attendance at the exhibit, both, or the like, on the foremost card 12 in the pack of cards 12, which thus serves as a personal identification badge while, at the same time, the user may provide attendants at the exhibit or booth of a convention, trade show, or the like, with one of his personal identification business or calling cards 12 by simply tearing the foremost card 12 in the pack thereof along the score line 15 so as to separate the lower printed portion or body of the card from the upper or card-holding portion 13 thereof. When this is done the foremost remaining card in the pack continues to serve as a personal identification or calling card since the cards are all identical, and this continues until all of the cards in the pack have been used up.

Thus, it will be seen that the new card unit 10 serves both as personal identification badge and as a pack of personal business or calling cards, for the uses and purposes set forth above.

A modification of the invention is illustrated in FIGS. 5 to 7, inclusive, of the drawings, and those parts thereof which are similar or comparable to corresponding parts in the form of the invention illustrated in FIGS. 1 to 4, inclusive, have been given the same reference numerals followed by the additional and distinguishing reference character "a."

In the form of the invention illustrated in FIGS. 5 to 7, inclusive, the pack of cards 11a is provided with a backing and attaching sheet 20 which is stapled or otherwise suitably fastened to the upper and card-holding end portions 13a of the cards 12a, as at 14a, and a suitable fastening means, such as a safety pin 21, or the like, is mounted in the backing and attaching sheet 20 to enable the user to attached the new combination personal identification badge and card unit 10a to an article of clothing 22 of the user.

When so attached to the clothing 22 of the user, the form of the invention shown in FIGS. 5 to 7, inclusive, may be used in the same manner as set forth above in connection with the use of the form of the invention illustrated in FIGS. 1 to 4, inclusive.

Another form of the invention is illustrated in FIGS. 8 to 11, inclusive, and those parts thereof which are similar or comparable to corresponding parts of the form of the invention illustrated in FIGS. 1 to 4, inclusive, have been given the same reference numerals followed by the additional and distinguishing character "b."

The form of the invention illustrated in FIGS. 8 to 11, inclusive, differs from the form of the invention illustrated in FIGS. 1 to 4, inclusive, and from the form of the invention illustrated in FIGS. 5 to 7, inclusive, in that in this form of the invention the pack of cards 11b are not stapled or otherwise fastened together, and in that this form of the invention embodies a card-holding casing 23 which may be made of any suitable form of material such, for example, as transparent plastic resinous sheet material such as, for example, an acrylic resin, or the like, and includes a transparent front wall portion 24 and a rear wall portion 25 and having a closed end wall portion 26 and an open end wall 27. The rear wall 25 has attachment means, in the form of a depending flap 14b, attached thereto and this depending attaching flap 14b may be formed as an integral downward extension of the rear wall 25 of the card-holding casing 24, or otherwise.

In the use of the form of the invention illustrated in FIGS. 8 to 11, inclusive, a pack of personal identification business or calling cards 11b may be slidably inserted into the body of the card-holding casing 24 through the open end 27 thereof, and the pack of personal identification business or calling cards 11b, and the card-holding casing 23 attached to the clothing of the user by inserting the depending flexible attaching flap 14b into the lapel pocket 17b of the user between the front flap 18b thereof and the body 19b of the garment in which the lapel pocket 17b is formed.

When the form of the invention shown in FIGS. 8 to 11, inclusive, is so arranged and when in use the foremost card 12b in the pack of personal identification business or calling cards 11b in the card-holding casing 23 is readily visible through the front transparent wall 24 of the card-holding casing 23 and thus serves as a personal identification badge, so that the name and address of the user, as shown thereon, may be readily seen by persons at booths, exhibits, and the like. In addition, when the user of the form of the invention shown in FIGS. 8 to 11, inclusive, calls at an exhibit or booth at a convention or trade show he may readily remove one of the personal identification business or calling cards 12b from the pack 11b thereof by slipping the same out of the card-holding casing 23 through the open end 27 thereof without interferring with the identifying function or use of the unit 10b as a personal identification badge carried or worn on the clothing of the wearer.

A further modification of the invention is illustrated in FIGS. 12 to 14, inclusive, of the drawings, and those parts thereof which are similar or comparable to corresponding parts in the form of the invention illustrated in FIGS. 8 to 11, inclusive, or to the parts in the form of the invention illustrated in FIGS. 5 to 7, inclusive, have been given the same reference numerals followed by the additional and distinguishing reference character "c."

The form of the invention illustrated in FIGS. 12 to 14, inclusive, is similar to the form of the invention shown in FIGS. 8 to 11, inclusive, and is similar, in some respects, to the form of the invention illustrated in FIGS. 5 to 7, inclusive, and in this form of the invention the rear wall 24c of the card-holding casing 23c has a fastening means, in the form of a safety pin 28, or the like, attached thereto to enable the card-holding casing 23c and included pack of personal identification calling or business cards 11c–12c to be attached to a garment or article of clothing 20c of the wearer.

When so attached and used, the form of the invention illustrated in FIGS. 12 to 14, inclusive, may be used in the same manner as described above in reference to the form of the invention illustrated in FIGS. 8 to 11, inclusive, of the drawings.

It will be noted that in all of the forms of the invention described hereinbefore, and as shown in the drawings, the new combination personal identification badge and card unit embodies a novel combination of a pack of identical personal identification data-bearing cards, card-holding means for holding the cards in assembled relationship, and means for fastening the pack of cards and the card-holding means to the clothing of the user so that at all times the foremost card in the pack serves as a personal identification badge or card, and the cards may be removed one at a time from the pack by the user without detaching the unit from the clothing of the wearer while, at the same time, the foremost remaining card in the pack continues to serve as a personal identification badge or card since all of the cards are identical.

It will thus be seen from the foregoing description, considered in conjunction with the accompanying drawings, that the present invention provides a new and improved pack of personal identification and calling cards having the desirable advantages and characteristics and accomplishing its intended objects, including those hereinbefore pointed out, and others which are inherent in the invention.

I claim:

1. A combination personal identification badge and card unit comprising a card-holding casing including a body of plastic sheet material having a rear wall and a transparent front wall, top and bottom walls, said top wall terminating rearwardly in a downwardly extending tongue overlapping said rear wall, and said unit further having an open end portion and a closed end portion, and a pack of personal identification data-bearing cards mounted in the said casing behind the said transparent front wall thereof, each of the said cards in the said pack of cards bearing personal identification data, and the foremost card in the said pack of cards providing a personal identification badge for the user, and the said cards in the said pack thereof being removable one at a time from the said card-holding casing through the said open end portion thereof while enabling the foremost remaining card in the said pack of cards to be seen through the said transparent front wall of said card-holding casing to provide a personal identification badge for the user, and said overlapping tongue terminating adjacent said bottom wall and providing means for attaching said unit to a garment of the user.

2. A combination personal identification badge and card unit comprising a card-holding casing including a body of plastic sheet material having a rear wall and a transparent front wall, top and bottom walls, said top wall terminating rearwardly in a downwardly extending tongue overlapping said rear wall, and said unit further having an open end portion and a closed end portion, and a pack of personal identification data-bearing cards mounted in the said casing behind the said transparent front wall thereof, each of the said cards in the said pack of cards bearing personal identification data, and the foremost card in the said pack of cards providing a personal identification badge for the user, and the said cards in the said pack thereof being removable one at a time from the said card-holding casing through the said open end portion thereof while enabling the foremost remaining card in the said pack of cards to be seen through the said transparent front wall of said card-holding casing to provide a personal identification badge for the user, said downwardly extending tongue projecting beyond the bottom wall and forming a means for attaching the unit to a garment of the user.

References Cited

UNITED STATES PATENTS

| | | | |
|---|---|---|---|
| 963,109 | 7/1910 | Abbott. | |
| 2,609,629 | 9/1952 | Hubbard | 40—1.5 |

EUGENE R. CAPOZIO, Primary Examiner

WENCESLAO J. CONTRERAS, Assistant Examiner